(12) United States Patent
Krol et al.

(10) Patent No.: US 7,861,977 B1
(45) Date of Patent: Jan. 4, 2011

(54) ADAPTIVE MATERIAL ACTUATORS FOR COANDA EFFECT CIRCULATION CONTROL SLOTS

(75) Inventors: William P. Krol, Portsmouth, RI (US); James S. Uhlman, Jamestown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1241 days.

(21) Appl. No.: 11/376,636

(22) Filed: Mar. 13, 2006

(51) Int. Cl.
 *B64C 3/00* (2006.01)
 *B64C 21/04* (2006.01)
(52) U.S. Cl. .................................................. 244/207
(58) Field of Classification Search ................ 244/198, 244/199.1, 199.3, 200.1, 207, 130; 239/DIG. 7
See application file for complete search history.

(56) References Cited

U.S. PATENT DOCUMENTS

| | | | |
|---|---|---|---|
| 2,624,281 A * | 1/1953 | Mcnally .................... 60/201 |
| 3,321,157 A * | 5/1967 | Turner ....................... 244/207 |
| 3,762,445 A | 10/1973 | Orita et al. |
| 3,841,588 A * | 10/1974 | Arnold et al. ............... 244/207 |
| 3,920,149 A | 11/1975 | Fortino et al. |
| 4,252,512 A | 2/1981 | Kornylak |
| 4,626,171 A | 12/1986 | Carter, Sr. et al. |
| 4,682,746 A * | 7/1987 | Thomas ...................... 244/207 |
| 5,067,509 A | 11/1991 | Hunter |
| 5,727,381 A * | 3/1998 | Rogers ......................... 60/231 |
| 5,791,601 A | 8/1998 | Dancila et al. |
| 6,039,269 A | 3/2000 | Mandzukic |
| 6,055,813 A | 5/2000 | Keller et al. |
| 6,095,175 A | 8/2000 | Miller et al. |
| 6,142,425 A | 11/2000 | Armanios et al. |
| 6,182,440 B1 | 2/2001 | Bilenas et al. |
| 6,315,216 B1 | 11/2001 | Boecking |
| 7,226,015 B1 * | 6/2007 | Prince et al. ................ 244/3.21 |
| 7,290,738 B1 * | 11/2007 | Rogers et al. ................ 244/207 |
| 2008/0087771 A1 * | 4/2008 | Boespflug et al. ........... 244/207 |
| 2009/0108125 A1 * | 4/2009 | Shmilovich et al. ........... 244/15 |

* cited by examiner

*Primary Examiner*—Timothy D Collins
*Assistant Examiner*—Valentina Xavier
(74) *Attorney, Agent, or Firm*—James M. Kasischke; Michael P. Stanley; JeanePaul A. Nasser

(57) ABSTRACT

A system and method of use are provided for introducing tangential control fluid flows along the surface of an aerodynamic member. The fluid flows are directed toward a coanda surface disposed at the trailing edge of the aerodynamic member. At least two injection slots are provided on opposite sides of the aerodynamic member to produce opposing forces. Control of the flow of fluid from each slot determines the net effect of these opposing forces. Smart material actuators are used to control the flow of fluid from each slot by varying the size of each slot.

1 Claim, 4 Drawing Sheets

ADAPTIVE MATERIAL ACTUATORS FOR COANDA EFFECT CIRCULATION CONTROL SLOTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention is directed to a system for introducing tangential control fluid flows along the surface of an aerodynamic member.

(2) Description of the Prior Art

The fluid flow or flow field around lifting surfaces, such as aircraft wings and helicopter rotor blades, determines the pressure distribution over these surfaces and, therefore, determines the resulting aerodynamic forces and moments acting upon such surfaces. Modification and control of those forces is achieved through modification and control of the flow field.

In fixed wing applications, the common method for controlling the flow field involves the use of a movable trailing edge surface (i.e. a wing flap). Moving the trailing edge surface or flap downward increases both the camber and the angle of attack of the fixed wing, increasing the negative pressure distribution along the upper surface of the fixed wing. This increase in negative pressure increases lift.

The traditional use of mechanical flaps, however, requires the use of a hydraulic actuator or actuators, increasing both weight and mechanical complexity. In addition, these mechanical systems have a relatively long response time, inhibiting rapid movement of the trailing edge surface. These limitations prohibit the use of movable trailing edge surfaces in applications where the wing moves and is not fixed (i.e. in helicopter rotor blades). In the case of helicopter rotor blades, the rate of rotation of the rotor blade is several rotations per second or more, and mechanically actuated movable trailing edges cannot respond rapidly enough.

The limitations associated with movable trailing edges in both fixed and rotating wing applications led to the development of alternate methods for controlling the fluid flow around aerodynamic members. One such development involves the blowing of air tangentially along a surface of the wing from one or more slots disposed along that surface. This tangential discharge of gas energizes the fluid flow in the vicinity of the surface of the wing (i.e the boundary layer), to inhibit flow separation and the associated adverse stalling effects. In addition, the lift generated by the wing is increased. An increase in lift is realized from the Coanda effect.

The use of the Coanda effect increases the circulation about an aerodynamic control surface above the level that would otherwise be attainable. This is accomplished by using an airfoil shape with a rounded trailing edge. Fluid injected tangent to the surface in the downstream direction through slots on one side of the airfoil near the trailing edge tends to flow around that edge: the circulation about (and therefore the lift produced by) the airfoil is increased dramatically. This effect was first observed by Henri Coanda in 1910.

Employing the Coanda effect on control surfaces attached to a vehicle has a number of potential benefits, including reduced overall drag and improved maneuverability. These benefits are due to the lift coefficients that are achievable with the Coanda effect. Whereas standard control surfaces, using angle-of-attack to achieve lift, may yield maximum sectional lift coefficients in the range of 0.8-1.0, control surfaces employing the Coanda effect may achieve lift coefficients in the range of 2.0-3.0 or greater.

For example, the trailing edge of the wing is formed as a smoothly curved surface, and the air discharged from the slots follows the smoothly curved surface until the balance between the pressure variation normal to the surface of the wing and the centrifugal force exerted on the discharge of air is lost. The end result is a modification of the pressure distribution along the surface of the wing that is equivalent to the changes created by a mechanical flap. Therefore, the discharge of air along the surface of a wing is an alternative to a movable trailing edge.

Mechanical flaps and the resulting changes in lift are controlled by extending and retracting the flap. When air flow is used, control is achieved by varying the flow rate of the air or the direction in which the air is being discharged, which is known as vectoring. Typically, both variable flow rates and vectoring are used as control mechanisms. Therefore, systems and methods were developed to provide the necessary control over flow rate and vectoring, in particular under real time flight conditions or in rotor blade applications.

A typical system used to control the air flow included a chamber filled with pressurized air. The pressurized air was discharged through a slot disposed adjacent or near the trailing edge of the wing such that the discharged air would travel tangent to the surface of the wing and around the smooth trailing edge. The flow of air out of the slots could be controlled, for example, using a screw mechanism to adjust the size of the slot opening. Another controlling factor of air flow is the pressure of the compressed air inside the chamber. Therefore, the flow rate of the compressed air out of the slot opening increases with increasing pressure in the chamber and decreases with decreasing pressure in the chamber.

The systems used to modify the air flow rate still had a relatively slow response time, especially as the size of the system increased. For example, modification of the flow about a wing requires a change in the size of the slot opening. When the slot opening is increased, the pressure inside the chamber needs to be increased, which requires a substantial amount of time. Conversely, reducing the slot size requires a reduction of the pressure inside the chamber. Pressure reduction is accomplished by bleeding pressure from the chamber, which again takes a significant amount of time to accomplish. Another complicating factor involves the inaccuracies involved in measuring pressure within the chamber.

Other attempts to control the air flow have used camming systems to alter the size of the slot opening mechanically. Such systems, however, are too bulky for many applications and do not significantly improve the response time of the system. Additional limitations of systems used to control the flow of air around the wing surface include the inability to control the airflow independently at different points along the slot or along the length of the wing. Therefore, the air flow out of the slot cannot be varied as a function of position along the wing.

U.S. Pat. Nos. 5,791,601 and 6,142,425 are directed to an apparatus and methods for aerodynamic blowing control using smart material actuators. A source of compressed air is provided that communicates with one or more slots or other outlets at a selected location on an aerodynamic member so that air can be blown from the slots or outlets. The characteristics of the blowing, including activation and deactivation, the magnitude, and the direction of the blown jet are controlled by a valve or nozzle mechanism adapted to interrupt or otherwise affect the compressed air stream provided to the slot. The valve or nozzle, in turn, is activated and controlled through the use of a smart material actuator such as, for example, a piezoelectric bender. In general, the valve or nozzle is formed by aligning corresponding slots or holes in two concentric cylinders or spheres. Therefore, maintaining proper alignment between the corresponding holes is important for providing the desired or calibrated control of the air flow over the aerodynamic member. In addition, the concentric members create a possible source of energy dissipating friction that could result in system failure. The method by which fluid is injected uses two concentric cylinders or spheres rotated relative to one another by smart materials.

For full control, a control surface needs to be able to produce forces in opposite directions. To produce these opposite forces using the Coanda effect, the control surface would have ejection slots on both sides of the control surface and would control the amount of air being ejected through the slots on each side. Prior solutions use separate plumbing and valving for each side or even each slot. This adds complexity to the design and places restrictive lower limits on the size of control surfaces.

Therefore, the need exists for a system to control the flow rate and vectoring of fluids ejected along an aerodynamic member with a response time that is suitable for use with rotating aerodynamic members and that reduces or eliminates friction between moving surfaces. Suitable systems will provide for the variation of flow with both time and location along the length of the aerodynamic member. In addition, full control will be accomplished by producing opposite forces using the Coanda effect.

SUMMARY OF THE INVENTION

Exemplary methods and systems in accordance with the present invention employ the Coanda effect for control of the flow field around an aerodynamic member such as a fixed wing or a rotating wing. An airfoil or aerodynamic member having a rounded trailing edge is used. Suitable aerodynamic members include fixed wings, propeller blades, helicopter rotors and ducts. As the ambient fluid through which the airfoil is moving flows past the airfoil, a control fluid is introduced tangent to the surface of the airfoil in a generally downstream direction through one or more slots disposed on the airfoil near the trailing edge. The control fluid flows around the trailing edge, producing a resulting force in the direction of the side from which the fluid was introduced. The resulting force is proportional to the momentum of the injected fluid over a wide range of speeds and flow rates.

In one embodiment to control the flow rate of the control fluid, injection slots are provided on opposite sides of the airfoil surface and the control fluid is introduced simultaneously through the slots on either side. In particular, the injection slots are located near the trailing edge coanda surface on either side of the aerodynamic member, e.g., on the top and bottom surfaces of a fixed wing. The required plumbing is minimized by plumbing the aerodynamic member only once.

Therefore, the injection slots located on either side of the aerodynamic member are in communication with a single common pressurized chamber or injection fluid-filled plenum.

The flow of control fluid is switched or varied between the injection slots located on either side of the aerodynamic member. Preferably, switching between the injection slots is accomplished locally at the aerodynamic member. The control fluid flow rate is constant, and the amount of control fluid being ejected out of each slot is controlled by adjusting the size of the slots locally. The sizes of the injection slots are adjusted using smart or adaptive material actuators, for example, piezo-electric materials or shape-memory alloys.

In one embodiment, a chamber or channel is provided along the trailing edge of the aerodynamic member, and a moveable member is disposed generally centrally in the channel to define the injection slots between the moveable member and the sides or edges of the channel. The moveable member is in communication with the smart material actuator. The smart material actuator is capable of moving the moveable member within the channel. Alternatively, other types of actuators can be used to move the moveable member. This movement changes the size of the injection slots. Alternatively, a stationary member is provided disposed in the channel, and the edges or lips of the channel are moved relative to the stationary member to change the size of the slots. In addition, valves internal to the lifting surface or disposed within the channel are provided in communication with the slots, which are formed between the stationary member and fixed edges or lips of the channel. These valves are used to direct the flow between slots located on opposite sides of the aerodynamic member.

The control fluid is introduced into the channel under pressure and exits through the injection slots defined between the moveable member and the edges or sides of the channel. By injecting control fluid through a first slot in excess of the control fluid flow through a second slot disposed on an opposite side of the aerodynamic member, a net force towards the side of the aerodynamic member containing the first slot is created. Systems in accordance with exemplary embodiments of the present invention reduce system weight and volume and increase response speed over conventional systems that use valves and separately plumbed sides.

DESCRIPTION OF THE PREFERRED EMBODIMENT

Exemplary systems and methods for controlling the flow field around an aerodynamic member in accordance with the present invention utilize a single plenum or chamber to hold a control fluid used to control the flow field, reducing the overall weight and volume of the system. In addition, the fluid injection pumps that are used to deliver and pressurize the control fluids are operated at a constant output, reducing the noise associated with the system. Embodiments of the flow field control system of the present invention that utilize smart material actuators eliminate the need for conventional control valves and provide for a control system that has a quick response time. In general, systems and methods in accordance with exemplary embodiments of the present invention are capable of controlling gas or fluid flows of all densities and compressibilities at relatively high rates.

Figure 1:
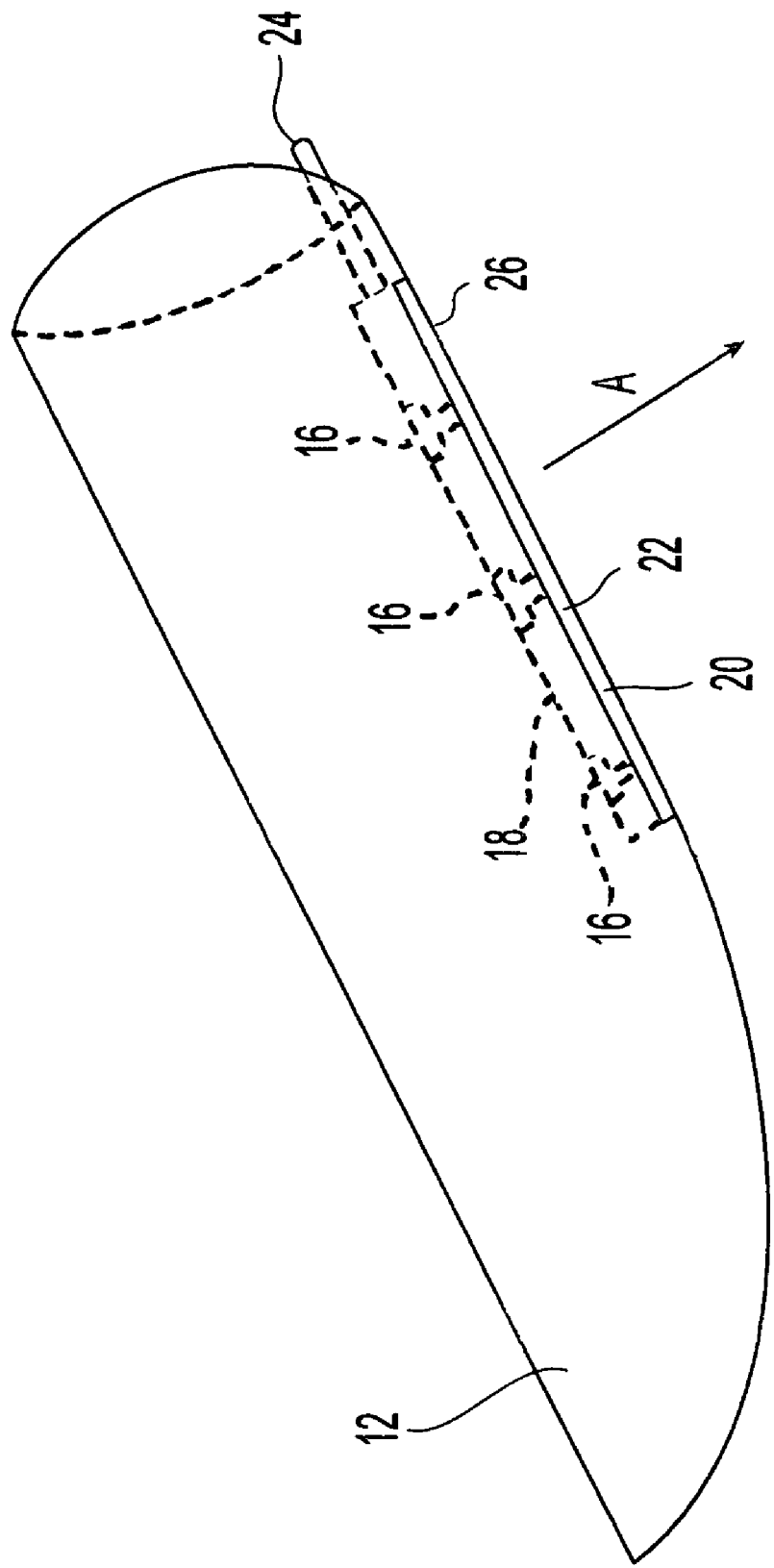
FIG. 1 is a perspective view of an aerodynamic member containing a fluid injection control system in accordance with the present invention.

Referring initially to FIG. 1, an exemplary embodiment of a system for controlling the flow field around an aerodynamic member 12 in accordance with the present invention is illustrated. Systems in accordance with the present invention can be used to control the flow field around a variety of aerodynamic members 12. Suitable aerodynamic members include, but are not limited to, the wings and control surfaces of fixed wing aircraft, rotating wings, the fuselage sections of the aircraft, the control surfaces of submarines and other watercraft, the control and body surfaces of rockets and missiles, propeller blades and helicopter rotor blades.

Systems and methods in accordance with the present invention can also be applied for blowing control in industrial applications such as spray painting and gas burner injection. As illustrated, the system is applied to the wing of a fixed wing aircraft, however, this embodiment is shown for illustrative purposes only, and the present invention is not limited to fixed wing aircraft applications.

At least one chamber, channel or plenum 18 is provided in the aerodynamic member 12. The system can include a plurality of chambers. The common chamber 18 is disposed in the aerodynamic member 12 and is capable of containing a pressurized control fluid. The common chamber 18 is used to supply the injection fluid to all locations or ports within the system.

The injection fluid is chosen to be compatible with the aerodynamic member 12 and the ambient conditions in which the aerodynamic member moves, i.e., air or water. Suitable injection fluids include, but are not limited to, air, water, liquid mists, inert gases, a reactant gas, a heated or cooled gas, a carrier gas for other gases, liquids, solid particles and combinations thereof.

In one embodiment, the injection fluid is air, which is readily available and easy to distribute. The injection fluid is pressurized using a compressor or pump (not shown) and is delivered to the chamber 18 through one or more pipes or conduits 24. Alternatively, the injection fluid is provided from a pressurized container such as a tank or lecture bottle that is attached to the delivery pipe 24. The injection fluid is pressurized to a pressure suitable to provide the desired flow of injection fluid.

The pressurized, compressed injection fluid is delivered to the chamber 18 and held until ejected through one or more slots 20 that are in communication with the chamber 18 and disposed generally near a trailing edge 26 of the aerodynamic member 12. The trailing edge 26 is generally defined as the edge of the aerodynamic member 12 opposite from the direction in which the aerodynamic member is moving. The injection fluid is ejected from the chamber 18 through the slots 20 generally in the direction indicated by arrow A. At the trailing edge 26, the injection fluid follows the coanda surface located at the trailing edge until centrifugal force causes separation of the injection fluid stream from the surface of the aerodynamic member 12. The movement of the injection fluid along the coanda surface shifts the stagnation points along the aerodynamic member 12 and modifies the air flow patterns about the aerodynamic member to control its aerodynamic characteristics.

Referring to FIGS. 2-5, the aerodynamic member 12 includes a first side surface 28 and a second side surface 30 that is generally disposed opposite the first side surface. In an embodiment when the aerodynamic member 12 is oriented as, for example, a fixed wing or rotor blade, the first surface 28 corresponds to a top surface, and the second surface 30 corresponds to a bottom surface. The control fluid is introduced tangentially to the first and second surfaces through the apertures or slots 20 that extend along the entire length or span of the first and second surfaces (see FIG. 1).

In one embodiment, a single slot 20 extends along the length of the first surface 28 and the second surface 30. Alternatively, a plurality of discrete slots, ports or nozzles are disposed along the first and second surfaces, each slot in communication with the chamber 18. In general, the length of the slot 20 varies in accordance with the demands of a specific application.

In addition, the shape or cross section of each slot 20 can vary. The slot is an elongated slot; however, other suitable shapes for the slot include, but are not limited to, a plurality of small holes or a series of short slots. Each slot can be a simple orifice or opening or can contain an injection nozzle, check valve or other suitable plumbing fittings.

The system includes a first injection slot 36 in communication with the chamber 18 and disposed on the first side 28 of the aerodynamic member 12 adjacent the trailing edge 26. In addition, the system includes a second injection slot 34 in communication with the common chamber 18 and disposed on the second side 30 of the aerodynamic member 12 adjacent the trailing edge 26. The first side 28 may be the top side of the aerodynamic member, and the second side may be the bottom side of the aerodynamic member 12. Injection fluid discharged from a first injection slot 36 travels along the coanda surface at the trailing edge 26 in a direction as indicated by arrow B. Injection fluid discharged from the second injection slot 34 travels along the coanda surface at the trailing edge 26 in a direction as indicated by arrow C.

The system also includes a control mechanism to distribute the flow of the pressurized control fluid from the chamber 18 through the first and second injection slots. By controlling the flow of control fluid between the first and second injection slots, the net resultant force on the aerodynamic member is controlled.

Figure 2:
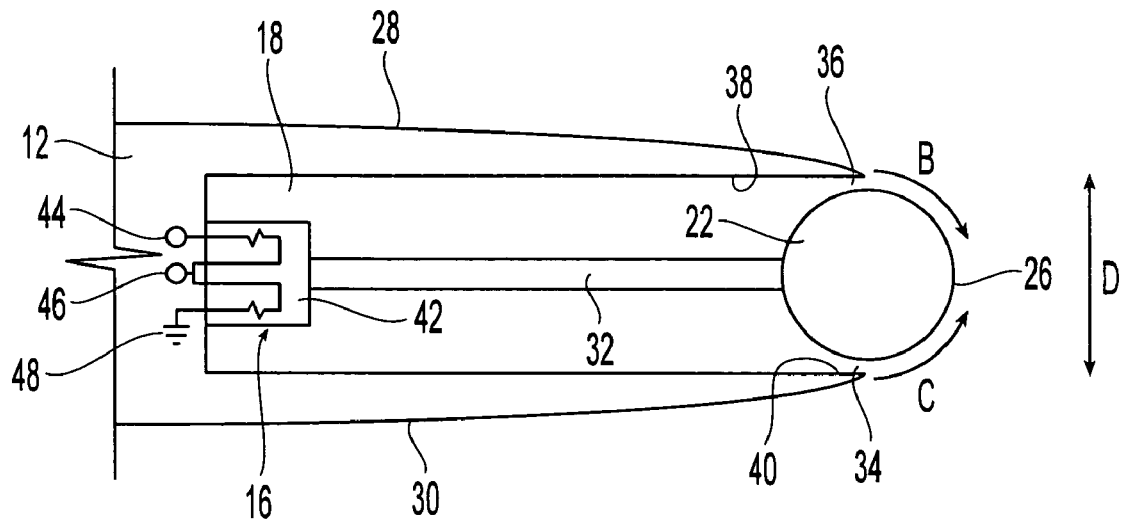
FIG. 2 is a cross-section view of the fluid injection control system of the present invention.

In one embodiment as illustrated in FIG. 2, the chamber 18 includes an opening adjacent the trailing edge 26 of the aerodynamic member 12, and a moveable member 22 is disposed in that opening. The moveable member 22 is cylindrical in shape and has a generally circular cross-section; however, the moveable member can be formed in any shape suitable to form the coanda surface at the trailing edge 26 of the aerodynamic member 12.

The first injection slot 36 is formed between the moveable member 22 and a first edge or lip 38 of the chamber opening. In addition, a second injection slot 34 is formed between the moveable member 22 and a second edge or lip 40 of the chamber opening. Variation of the size and shape of the each one of the injection slots is accomplished by moving the moveable member 22 in the opening with respect to the first and second edges of the chamber opening. This includes moving the moveable member 22 into and out of the chamber and moving the moveable member up and down in the direction indicated by arrow D.

In one embodiment, the system includes at least one actuator 16 in contact with the moveable member 22. As illustrated in FIG. 1, the system can include a plurality of actuators 16 in communication with the moveable member 22. Any actuator capable of moving the moveable member in the direction of the first edge or second edge (movement direction D) to adjust the size of the first injection slot 36 and the second injection slot 34 can be used. Suitable actuators include mechanical actuators.

The actuator can be a smart material actuator such as a piezo-electric actuator or a shape-memory alloy actuator. As used herein, a smart material refers to any substance or material in a solid state that can be used to generate a straining of the substance by means other than mechanical loading. Smart materials include, but are not limited to, piezo-electric materials, elecrostrictive materials, magnetostrictive materials and shape-memory alloys. Shape-memory alloys are materials that strain when a microstructural phase change and consequent shape deformation is produced through a temperature change. These materials generally exhibit a large deformation, but have large time constants. Magnetostrictive materials are materials that strain or deform when a magnetic field is applied. Electrostrictive materials deform under the influence of an electric field, and piezo-electric materials deform when a control voltage is applied.

These smart materials are used in smart material actuators, which refers to any device that utilizes a smart material or a combination of smart materials to achieve a controlled change in the dimensions or shape of the actuator under the effect of a non-mechanical input (for example: electric fields, control voltages, magnetic fields and temperature fields).

Any suitable arrangement for a smart material actuator can be used as the actuator 16 in communication with the moveable member 22. As illustrated, the actuator 16 includes a control arm portion 32 fixedly connected at one end to the moveable member 22, extending through the chamber 18 and anchored to a smart or adaptive material base 42.

The adaptive material base 42 includes a supply voltage contact 44, a source to earth ground contact 48 and an actuation voltage contact 46. A sufficient voltage is applied to the adaptive material base 42, and upon delivery of an actuation voltage, the adaptive material deforms, causing a change of shape in the adaptive material that is translated through the control arm 32 to the moveable member 22 to affect the desired change in the size of the first and second injection slots.

A control system is provided in communication with the actuator 16 to control the actuation and movement of the moveable member 22 to achieve the desired net force on the aerodynamic member or net change in the flow field. An applied voltage can be calibrated and associated against the movement or deflection of the moveable member 22. Then, the desired movement is read from a look-up table along with the associated applied voltage.

Figure 6:
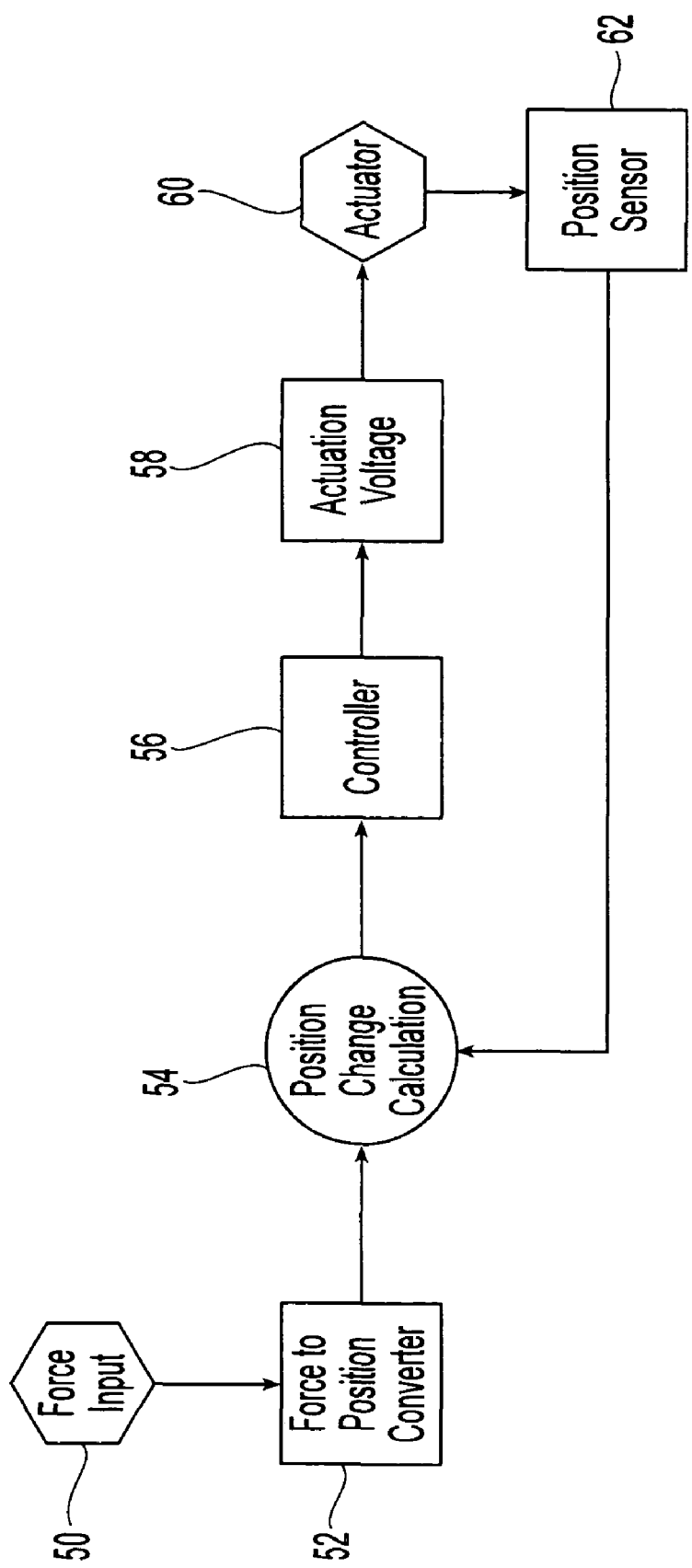
FIG. 6 is block diagram illustrating an embodiment of controlling an actuator for use in the control system of the present invention.

As illustrated in FIG. 6, control of the actuator can be operated as a feedback type loop. As illustrated, the desired force on the aerodynamic member is inputted 50 and communicated to a force-to-position converter 52. The force-to-position converter 52 determines the position of the actuator 60 (exemplifying actuators 16, 64 and 66) necessary to achieve the desired force. This position is communicated to a module 54 that compares the desired position with the current position of the actuator 60 as communicated by a position sensor 62. The module 54 communicates any necessary changes in the current position of the actuator 60 to a controller 56, which determines the necessary voltage to achieve that change and instructs a voltage generator 58 to create that actuation voltage and deliver the voltage to the actuator 60.

Smart material actuators respond rapidly to the application or removal of actuation or control voltages. Therefore, the injection fluid can be modulated rapidly, which allows control systems in accordance with the present invention to be used for many different types of flow field applications including rotating wings and helicopter rotor blade applications.

Figure 3:
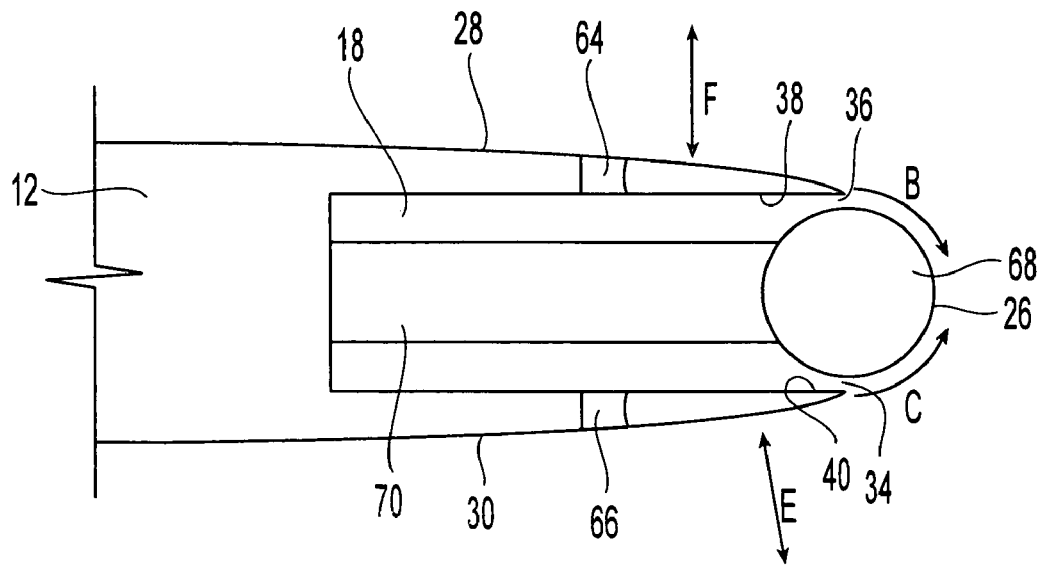
FIG. 3 is a cross-section view of another embodiment of the fluid injection control system of the present invention.

In another embodiment, the size of the first and second injection slots are varied by moving the sides or lips of the chamber. As illustrated in FIG. 3, the chamber 18 includes an opening adjacent the trailing edge 26, and a stationary member 68 is disposed in the opening. The stationary member 68 is secured to an anchor structure 70 extending through the chamber 18. Suitable arrangements and shapes of the stationary member 68 are the same as for the moveable member 22 including shaping the stationary member to provide a smooth coanda surface at the trailing edge 26. The first injection slot 36 is formed between the stationary member 68 and the first edge 38 of the chamber opening. In addition, the second injection slot 34 is formed between the stationary member 68 and the second edge 40 of the chamber opening. Movement of the first and second edges with respect to the stationary member 68 changes the shape and size of the first and second injection slots.

A first actuator 64 is provided in communication with the first edge 38 to move the first edge with respect to the stationary member 68, for example in the direction of arrow F, to adjust the size of the first injection slot 36. A second actuator 66 is provided in communication with the second edge 40 to move the second edge with respect to the stationary member 68, for example in the direction of arrow E, to adjust the size of the second injection slot 34. Suitable materials and control mechanisms for the first and second actuators are the same as for the actuator 16 used in the moveable member embodiment.

Figure 4:
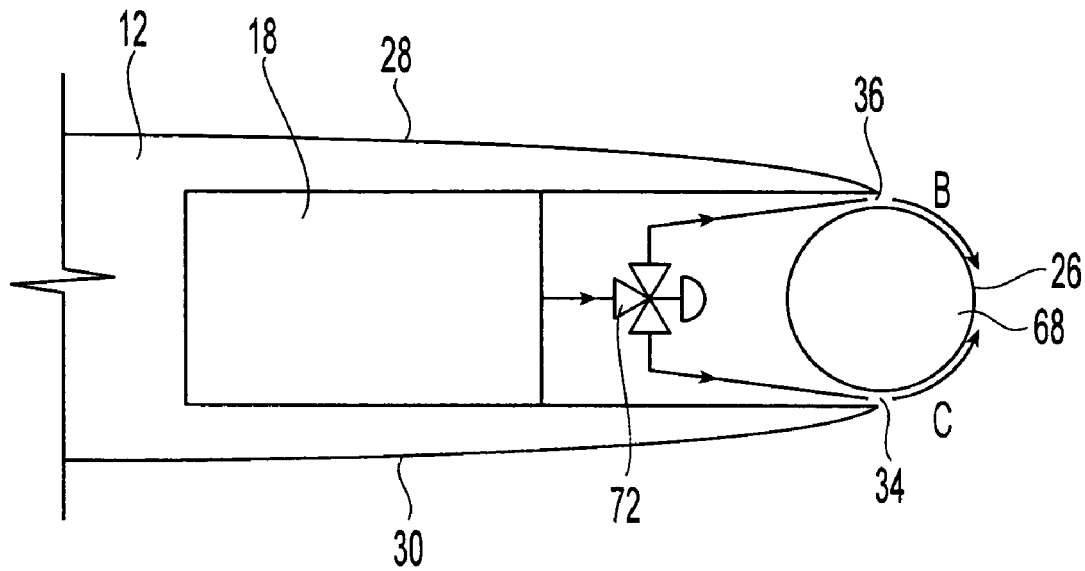
FIG. 4 is a cross-section view of yet another embodiment of the fluid injection control system of the present invention.
Figure 5:
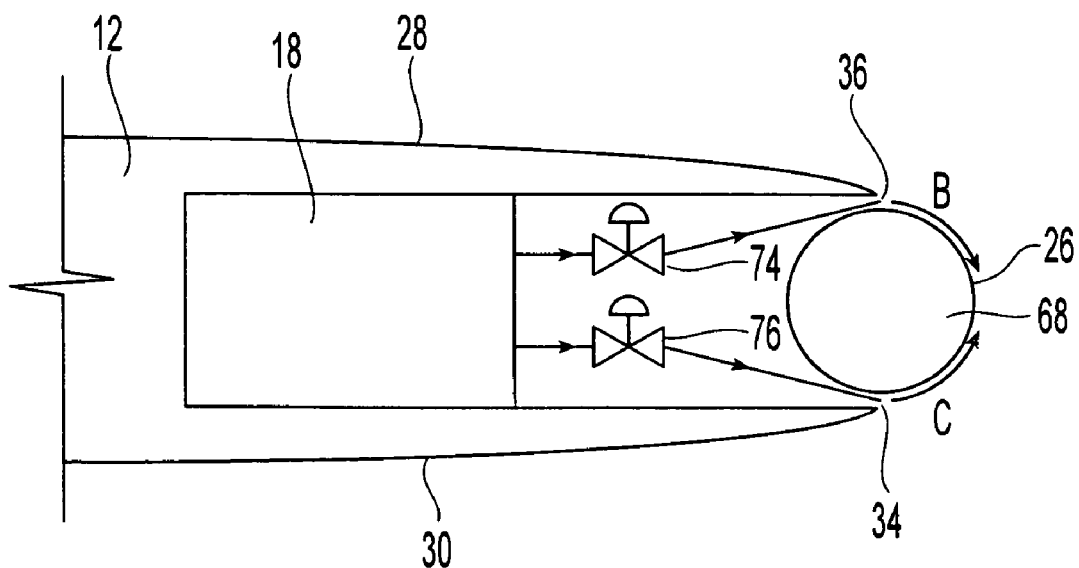
FIG. 5 is a cross-section view of yet another embodiment of the fluid injection control system of the present invention.

Referring to FIGS. 4 and 5, in another embodiment, internal valves are used instead of actuators to control the flow of injection fluid between the first and second injection slots. As illustrated, the stationary member 68 is provided in the opening of the chamber 18 to create the first and second injection slots.

A three-way control valve 72 is used to control the flow of injection fluid from the chamber 18 to the first and second injection slots. Alternatively, a first control valve 74 is used to control the flow of fluid to the first injection slot, and a second control valve 76 is used to control the flow of fluid to the second injection slot. Suitable methods for controlling the three-way control valve 72 and the first and second two-way control valves are known and available in the art. In general, the flow of injection fluid is controlled to achieve the desired net force on the aerodynamic member.

As illustrated, the system is illustrated using two injection slots on either side of the aerodynamic member 12 that run substantially the length of the surface of the aerodynamic member. However, other embodiments and arrangements of slots are possible having variations in the number, location, shape, orientation and size of the slots.

In accordance with an exemplary method for controlling the flow field around an aerodynamic member, a control fluid flow is introduced simultaneously from at least two injection slots disposed on substantially opposite sides of the aerodynamic member adjacent or near the trailing edge. The rate at which the control fluid is introduced from each injection slot is controlled to produce a desired resultant force on the aerodynamic member. In general, the control fluid is introduced tangential to the surface of the aerodynamic member to flow toward the trailing edge and around the coanda surface located at the trailing edge. The control fluid flow is introduced from the common chamber that is in communication with each one of the injections slots. The chamber contains the control fluid under pressure.

In order to control the rate of introduction of the control fluid through the injection slots, the size of each injection slot is adjusted. In one embodiment, the size of each injection is adjusted using a smart material actuator such as a piezo-electric actuator to adjust the size of each injection slot. For example, the smart material actuator is used to move the moveable member disposed in the opening of the control fluid filled chamber. The moveable member is moved between opposing edges of the opening to adjust the size of the injection slots.

Although illustrated for applications such as fixed wings for use in aircraft applications, systems and methods in accordance with the present invention can be used in any application that requires a highly accurate, low cost, and reliable method of controlling the flow of control fluid from injection slots. These applications include fine steering corrections or adjustments for a submarine, spray painting and generating a gas flame with improved burning efficiency.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A system for controlling the flow field around an aerodynamic member, said system comprising:
    a chamber disposed in the aerodynamic member, said chamber capable of containing a pressurized control fluid;
    a first injection slot in communication with said chamber and disposed on a first side of the aerodynamic member adjacent a trailing edge of the aerodynamic member;
    a second injection slot in communication with said chamber and disposed on a second side of the aerodynamic member adjacent the trailing edge, the first side substantially opposite the second side; and
    a control mechanism to distribute a flow of the pressurized control fluid from said chamber through said first and second injection slots such that the flow of the pressurized control fluid controls the flow field around the aerodynamic member;
    wherein said chamber comprises an opening adjacent the trailing edge of the aerodynamic member;
    wherein said control mechanism comprises a permanently stationary member by being secured to an anchor structure with said stationary member disposed in the opening and forming said first injection slot between said stationary member and a first edge of said opening and said second injection slot between said stationary member and a second edge of said opening and wherein said control mechanism comprises a first actuator in communication with said first edge to move said first edge with respect to said stationary member to adjust the size of said first injection slot and wherein said control mechanism comprises a second actuator in communication with said second edge to move said second edge with respect to the stationary member to adjust the size of said second injection slot.

* * * * *